K. PROBST.
TRANSMISSION GEARING FOR MOTOR VEHICLES.
APPLICATION FILED JAN. 11, 1908.
905,226.
Patented Dec. 1, 1908.
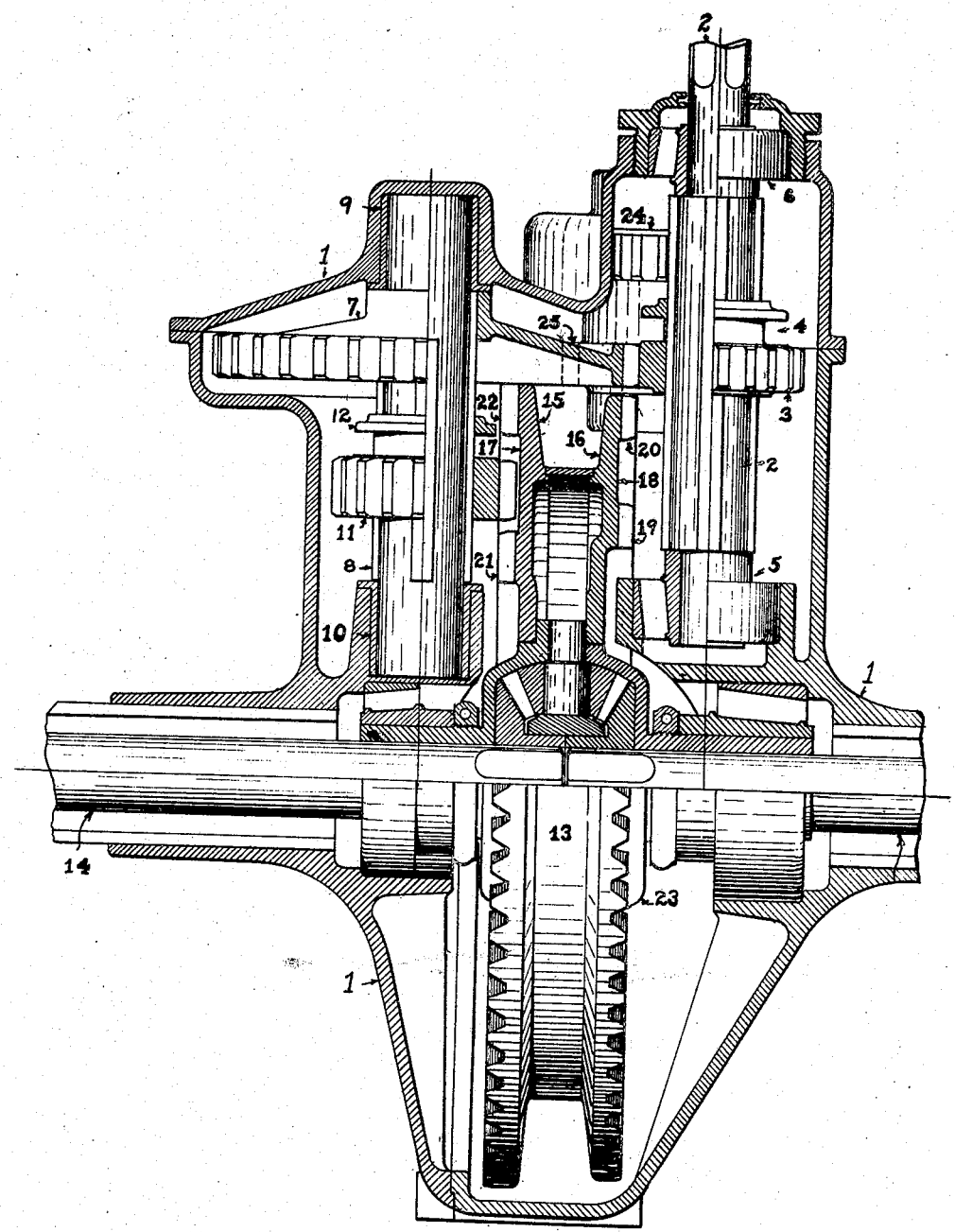
WITNESSES:
INVENTOR.
Karl Probst
BY
ATTORNEY.

UNITED STATES PATENT OFFICE.

KARL PROBST, OF COLUMBUS, OHIO, ASSIGNOR OF FIFTY-ONE ONE-HUNDREDTHS TO THE SEAGRAVE COMPANY, OF COLUMBUS, OHIO, A CORPORATION OF OHIO.

TRANSMISSION-GEARING FOR MOTOR-VEHICLES.

No. 905,226.     Specification of Letters Patent.     Patented Dec. 1, 1908.

Application filed January 11, 1908. Serial No. 410,436.

*To all whom it may concern:*

Be it known that I, KARL PROBST, a citizen of the United States, residing at Columbus, in the county of Franklin and State of Ohio, have invented certain new and useful Improvements in Transmission-Gearing for Motor-Vehicles, of which the following is a specification.

My invention relates to improvements in gearing for motor vehicles and embodies a construction which permits direct driving from the primary shaft to the axle driving construction at a plurality of speeds.

It also consists in the employment of a secondary shaft driven by the primary shaft, but which drives the axle driving construction directly without again transmitting to the primary shaft.

It further consists in a construction whereby, when the primary shaft is driving the axle directly, the secondary shaft is idle.

It consists further in the features enumerated and further features and their combinations, all of which will hereinafter clearly be set forth.

Referring to the drawings which are hereto attached and hereby made a part of this specification, the figure is a plan view partly in section of my construction showing the primary and secondary shafts and the driving connections on the axle, all of which are inclosed within a casing.

In the drawings, in which the same numeral indicates the same part throughout, 1 is a casing inclosing my transmission construction, 2 is the driving shaft connected with the engine in any of the usual ways, and not deemed necessary to be shown herein, and 3 is a pinion mounted on said primary shaft carrying the extension 4 which is adapted to be engaged by a lever in the usual way, for moving said pinion 3 longitudinally of the shaft 2, the latter having its inner bearing in the casing at 5, and an outer bearing in the casing at 6. The pinion 3 when properly stationed on the primary shaft 2 is adapted to mesh with the gear 7 which is mounted on the secondary shaft 8 to drive the same, said secondary shaft being journaled at its opposite ends in the casing at 9 and 10. Shaft 8 carries thereon a longitudinally slidable pinion 11, adapted to be moved on said shaft by means of the engagement of a lever in the well known way (not shown) with the extension 12 formed on said pinion 11, and this sliding capacity of the pinion 11 renders it possible to engage the same with a driving construction or device 13 mounted on the axle 14 to impart motion to said vehicle. The axle driving construction 13 mounted on said axle 14 is formed preferably of two plates 15 and 16 having formed on their oppositely disposed faces 17 and 18 a plurality of concentric crown gears, shown at 19 and 20, 21 and 22. The gears on face 18 are adapted to mesh with pinion 3 and the gears on face 17 are adapted to mesh with pinion 11.

When it is desired to operate the vehicle at its highest rate of speed, pinion 3 is moved along the shaft 2 until it meshes with the crown gear 19 on plate 16, and in this position, the power is transmitted directly from the primary shaft 2 to the axle 14 without the intervention of any other gearing construction; but if it is desired to drive the vehicle at a lower rate of speed, pinion 3 may be moved along the shaft 2 until it meshes with crown gear 20 on plate 16, and in this position it is seen that the axle is also driven directly from the primary shaft. Now if it be desired to operate the vehicle more slowly, pinion 3 may be moved along the shaft 2 until it meshes with gear 7 mounted on the secondary shaft 8, whereby motion is imparted to said secondary shaft; and to drive the vehicle at a third rate of speed, the pinion 11 should be moved along the secondary shaft until it engages the crown gear 21 on plate 15. It is pointed out that in this position of the parts the motion is communicated directly from the secondary shaft to the axle without the intervention of gearing other than that described, and without transmitting the motion back to the primary shaft, and I therefore reduce and transmit directly to the axle from the secondary shaft. To still further reduce the rate of speed, pinion 11 may be moved along the secondary shaft 8 until it meshes with crown gear 22 on plate 15, whereby motion is transmitted directly to the axle 14 in the same manner as it is transmitted by the meshing of pinion 11 with the crown gear 21. Plates 15 and 16 are mounted rigidly upon the housing 23, which contains the differential gearing. To obtain reverse movement I slide the pinion 3 along the primary shaft 2 to engage the gear 24, which is rigidly connected with gear 25, the latter being adapted to mesh with gear 7 on secondary shaft 8, which drives the vehicle in the manner above pointed out. In operation therefore shaft 2 is driven from the engine, and through pinion 3 and plate 16 drives the axle 14 directly at either of two speeds, determined by whether pinion 3 meshes with crown gear 19 or 20; while the vehicle is thus being driven, the secondary shaft 8 is idle. To drive the vehicle at reduced speeds, pinion 3 is brought into mesh with gear 7, whereby the secondary shaft is rotated, and by sliding pinion 11 along said shaft, it is brought into mesh with any desired crown gear on plate 15, whereby the axle is rotated directly from said secondary shaft. It is therefore noted that the driving of the axle and consequently the operation of the machine is effected directly from either the primary shaft or the secondary shaft, and when from the former, the latter is idle; when the secondary shaft is actuated, the speed is reduced, but it will be noted that in order to drive at the reduced speed it is not necessary in my construction to transmit again to the primary shaft and drive the axle therefrom. Consequently my construction is simplified and tends to economy of material and also economy of parts in operation; I accomplish these results by the use of the crown gear wheels, whereas in the usual form of transmission gearing construction, bevel gears are interposed.

A single pinion on the primary shaft answers the purposes contemplated in my gearing construction, inasmuch as it may be moved along the shaft, as desired, to mesh with one of the crown gears, or to mesh with the reducing gear mounted on the secondary shaft; a single slidable pinion on the secondary shaft also suffices for my purpose, and it is therefore seen that when I drive directly from the primary shaft a pinion and crown gear alone are necessary for that purpose, and when I drive from the secondary shaft, only two pinions, a reducing gear and a crown gear are necessary; so that for the lower speeds not more than two reductions are required. I accomplish my purposes with this small number of gears and pinions by the use of the crown gear construction, which renders it possible to employ only a single pinion on each shaft for creating a plurality of speeds, by sliding said pinion along the shaft to reach the crown gear with which it is desired to mesh on any particular occasion. I thereby avoid all lateral swinging of gears or pinions, and the use of bevel gears, whereby I am enabled to drive directly and therefore obtain more satisfactory results.

A greater number of rows of teeth on the crown gear wheels may be provided thereby rendering it possible to drive the vehicle at a still greater number of rates of speed, and other changes in details may be made without departing from the spirit of my invention; hence I do not wish to be confined to the specific construction shown, but desire to claim the various forms of construction which fall within the spirit of my invention and within the proper scope of the appended claims.

What I claim is:

1. Gearing for a motor vehicle comprising a primary shaft, a pinion mounted slidably thereon, a secondary shaft, a gear rigidly mounted thereon adapted to mesh with said pinion whereby said secondary shaft is rotated, a pinion slidably mounted on said secondary shaft, an axle and a crown gear mounted thereon with which said pinion on said secondary shaft is adapted to mesh, whereby said vehicle is operated.

2. Gearing for a motor vehicle comprising a primary shaft, a pinion slidably mounted thereon, a secondary shaft, a gear rigidly mounted thereon adapted to mesh with said pinion whereby said secondary shaft is actuated, a pinion slidably mounted upon said secondary shaft, an axle, a plate having a plurality of concentric crown gears thereon mounted upon said axle and adapted to mesh with said pinion on said secondary shaft, whereby the said vehicle may be operated directly from said secondary shaft at varying speeds.

3. Gearing for a motor vehicle comprising a primary shaft, a secondary shaft, a fixed gear thereon, an axle, a crown gear mounted thereon and means on said primary shaft for driving said crown gear or said secondary shaft at the will of the operator, and whereby when said crown gear is being actuated by said means, said secondary shaft is idle.

4. Gearing for a motor vehicle comprising a primary shaft, a secondary shaft, a fixed gear thereon, an axle, a crown gear mounted thereon, slidable means for imparting motion from said primary shaft to said crown gear or to said secondary shaft directly, and means carried by said secondary shaft for actuating said crown gear directly from said secondary shaft.

5. Gearing for a motor vehicle comprising a primary shaft, an axle, crown gears mounted thereon, a secondary shaft, a fixed gear thereon, a pinion carried by said primary shaft adapted to be brought into mesh with certain of said crown gears to actuate the same at varying degrees of speed, said pinion also being adapted to drive said secondary shaft, and a pinion mounted upon said secondary shaft adapted to actuate certain of said crown gears and operate said vehicle when said first mentioned pinion is engaged in actuating said secondary shaft.

6. Gearing for a motor vehicle comprising a primary shaft, an axle, crown gears mounted thereon, a single pinion mounted upon said primary shaft and adapted to engage certain of said crown gears to rotate the same at varying degrees of speed, a secondary shaft, a fixed gear thereon, and a single pinion mounted thereon adapted to engage certain of said crown gears to actuate the same at varying degrees of speed, said secondary shaft being adapted to be actuated by said pinion mounted upon said primary shaft.

7. Gearing for a motor vehicle comprising an axle, oppositely faced crown gears mounted thereon, a primary shaft, a secondary shaft, slidable means on said primary shaft adapted to engage a selected crown gear facing in one direction, a reducing gear carried by said secondary shaft adapted to be driven by said slidable means and means carried on said secondary shaft adapted to engage a selected crown gear facing in the other direction to actuate said vehicle.

8. Gearing for a motor vehicle comprising an axle, oppositely faced crown gears mounted thereon to drive the same, a primary shaft, a pinion slidably mounted upon said shaft adapted to engage a selected crown gear facing in one direction, a secondary shaft, a pinion slidably mounted thereon adapted to engage a selected crown gear facing in the opposite direction, and a reducing gear mounted upon said secondary shaft with which said pinion on said primary shaft is adapted to mesh to actuate said secondary shaft.

9. Gearing for a motor vehicle comprising a primary shaft, a secondary shaft, an axle, a crown gear mounted thereon, a slidable pinion on said primary shaft for driving said crown gear, a reducing gear on said secondary shaft, a slidable pinion thereon, a reverse gear adapted to mesh with said reducing gear, said slidable pinion being adapted to be thrown into mesh with said reverse gear.

10. Gearing for a motor vehicle comprising a primary shaft, an axle, crown gears mounted thereon, a secondary shaft, a slidable pinion thereon adapted to be brought into mesh with certain of said crown gears to actuate the same, a reducing gear on said secondary shaft, a reverse gear adapted to mesh with said reducing gear, a slidable pinion on said primary shaft adapted to mesh with said reverse gear, whereby the direction of travel may be changed.

In testimony whereof I affix my signature in the presence of two witnesses.

KARL PROBST.

Witnesses:
A. RAGER,
GEO. W. RIGHTMIRE.